(12) United States Patent  
Lavine et al.

(10) Patent No.: US 10,399,701 B2
(45) Date of Patent: Sep. 3, 2019

(54) SHOCK-RESISTING DEVICE AND METHOD

(71) Applicant: Raytheon Company, Waltham, MA (US)

(72) Inventors: Jason Lavine, McKinney, TX (US); Brian M. Graue, McKinney, TX (US); Brett A. Miller, Garland, TX (US)

(73) Assignee: Raytheon Company, Waltham, MA (US)

( * ) Notice: Subject to any disclaimer, the term of this patent is extended or adjusted under 35 U.S.C. 154(b) by 365 days.

(21) Appl. No.: 15/093,341

(22) Filed: Apr. 7, 2016

(65) Prior Publication Data

US 2017/0291719 A1 Oct. 12, 2017

(51) Int. Cl.
| | |
|---|---|
| *B64D 47/08* | (2006.01) |
| *F16F 15/02* | (2006.01) |
| *G01C 19/26* | (2006.01) |
| *B64C 39/02* | (2006.01) |
| *F16F 15/067* | (2006.01) |
| *F16M 13/02* | (2006.01) |
| *G03B 15/00* | (2006.01) |
| *G03B 17/56* | (2006.01) |

(52) U.S. Cl.
CPC ............ *B64D 47/08* (2013.01); *B64C 39/024* (2013.01); *F16F 15/02* (2013.01); *F16F 15/067* (2013.01); *F16M 13/022* (2013.01); *G01C 19/26* (2013.01); *G03B 15/006* (2013.01); *G03B 17/561* (2013.01); *B64C 2201/127* (2013.01)

(58) Field of Classification Search
CPC .... B64D 47/08; B64C 2201/127; G01C 19/26
See application file for complete search history.

(56) References Cited

U.S. PATENT DOCUMENTS

| | | | |
|---|---|---|---|
| 2,874,576 A | * | 2/1959 | Barnes ................... G01C 19/26 74/5.1 |
| 3,094,054 A | | 6/1963 | Moors et al. |
| 3,430,499 A | | 3/1969 | Craig |
| 3,473,391 A | | 10/1969 | Williamson et al. |
| 3,677,098 A | | 7/1972 | Davis |
| 3,795,139 A | | 3/1974 | Peck |
| 3,913,870 A | | 10/1975 | Bolick |

(Continued)

FOREIGN PATENT DOCUMENTS

| | | |
|---|---|---|
| GB | 1464116 A | 2/1977 |
| JP | 01307603 A | 12/1989 |
| JP | 09210255 A | 12/1997 |

OTHER PUBLICATIONS

International Search Report and Written Opinion in PCT/US2016/062810, dated Mar. 13, 2017.

*Primary Examiner* — Richard R. Green
(74) *Attorney, Agent, or Firm* — Renner, Otto, Boisselle & Sklar, LLP

(57) ABSTRACT

A shock-resisting device includes a snubber that may be selectively moved from a retracted position to an engaged position to selectively create a stiff attachment between a vibration-isolated gimbal of the device, and an outer shell of the device. The gimbal is movable relative to the outer shell. The snubber includes a retainer maintaining the snubber in the retracted position, wherein the snubber is configured to move from the retracted position to the engaged position in response to loss of power to the retainer.

20 Claims, 16 Drawing Sheets

(56) References Cited

U.S. PATENT DOCUMENTS

| | | | |
|---|---|---|---|
| 4,927,097 A * | 5/1990 | Allen | B64G 1/641 244/118.1 |
| 5,124,938 A | 6/1992 | Algrain | |
| 6,598,492 B1 | 7/2003 | Corzilius | |
| 8,091,833 B2 | 1/2012 | von Flotow et al. | |
| 9,170,106 B2 | 10/2015 | Miller | |
| 2009/0301236 A1 | 12/2009 | Baudasse | |
| 2013/0277500 A1* | 10/2013 | Miller | G01C 19/26 244/131 |

* cited by examiner

SHOCK-RESISTING DEVICE AND METHOD

FIELD OF THE INVENTION

The invention relates generally to a shock-resisting device and method, and more particularly to a rapidly deployable shock-resisting device for restraining an inner payload relative to an outer shell and respective method.

DESCRIPTION OF THE RELATED ART

Force isolation is advantageous particularly to isolate a complex, sensitive, critical, and/or expensive component from vibration, shock, or impact. In such an arrangement there may be damping devices between parts, with the vibration-isolated part able to move to some extent relative to the other part. One problem is that severe shocks to such systems may cause undesirable movement or forces on the isolated parts. It would be desirable for improvements in such devices such as to create a stiff attachment between the vibration-isolated part and another part, and in methods of using such devices.

SUMMARY OF THE INVENTION

The present disclosure provides an exemplary shock-resisting device including a snubber for restraining an inner payload relative to an outer shell. For example, the exemplary device may be utilized for restraining an inner optics payload relative to an external gimbal or frame of a vehicle, such as an aircraft. The shock-resisting device is rapidly deployable and protects the payload from shock damage. The shock-resisting device may also be configured to serve as a failsafe, deploying in the event of power loss to the inner payload or to the vehicle as a whole.

An exemplary shock-resisting device includes a snubber that may be selectively moved from a retracted position to an engaged position to selectively create a stiff attachment between a vibration-isolated gimbal of the device, and an outer shell of the device. The gimbal is movable relative to the outer shell. The snubber includes a retainer maintaining the snubber in the retracted position, wherein the snubber is configured to move from the retracted position to the engaged position in response to loss of power to the retainer.

According to one aspect, a shock-resisting device includes an outer shell, an inner gimbal movable relative to the outer shell, and an actuatable snubber movable between a retracted position and an engaged position to limit movement of the outer shell and the inner gimbal relative to one another. The actuatable snubber includes a retainer configured to maintain the actuatable snubber in the retracted position, and the actuatable snubber is configured to move from the retracted position to the engaged position in response to loss of power to the retainer.

The actuatable snubber may include a potential-energy-storing reservoir coupled to the retainer, wherein the potential-energy-storing reservoir is configured to release stored potential energy upon loss of power to facilitate moving the actuatable snubber from the retracted position to the engaged position.

The potential-energy-storing reservoir may include a resilient member.

The resilient member may include a windable spring.

The retainer may include a powered clutch.

The movement of the actuatable snubber from the retracted position to the engaged position may be wholly mechanical.

The actuatable snubber may include a dog coupled to the retainer that is movable in response to loss of power to the retainer to engage a corresponding recess in one of the outer shell or the inner gimbal, thereby resisting relative movement between the outer shell and the inner gimbal.

The actuatable snubber may be coupled to the other of the outer shell or the inner gimbal.

A recess cavity of the recess may have a diametrical cross-section sized larger than a diametrical cross-section of the dog receivable therein, and an edge of the recess may be radially inwardly-beveled to direct the dog into the cavity of the recess located radially inwardly of the edge.

The inner gimbal may be vibration isolated from the outer shell.

The inner gimbal may include a visual sensor.

An unmanned aerial vehicle may include a fuselage and the shock-resisting device mechanically coupled to the fuselage.

According to another aspect, an unmanned aerial vehicle includes a fuselage, and a shock-resisting device mechanically coupled to the fuselage, where the shock-resisting device includes an outer shell, an inner gimbal movable relative to the outer shell, and an actuatable snubber movable between a retracted position and an engaged position to limit movement of the outer shell and the inner gimbal relative to one another. The actuatable snubber includes a retainer configured to maintain the actuatable snubber in the retracted position. The actuatable snubber is configured to move from the retracted position to the engaged position in response to loss of power to the retainer.

The actuatable snubber may include a potential-energy-storing reservoir coupled to the retainer, where the potential-energy-storing reservoir is configured to release stored potential energy upon loss of power to the retainer, to facilitate moving the actuatable snubber from the retracted position to the engaged position.

The actuatable snubber may include a dog coupled to the retainer, the dog movable in response to loss of power to the retainer to engage a corresponding recess in one of the outer shell or the inner gimbal, thereby resisting relative movement between the outer shell and the inner gimbal.

A recess cavity of the recess may have a diametrical cross-section sized larger than a diametrical cross-section of the dog receivable therein, and wherein an edge of the recess is radially inwardly-beveled to direct the dog into the recess cavity of the recess located radially inwardly of the edge.

According to yet another aspect, a shock-resisting device includes an outer shell, an inner gimbal movable relative to the outer shell, and an actuatable snubber actuatable to create a stiff attachment between the outer shell and the inner gimbal. The actuatable snubber includes a dog movable from a retracted position to an engaged position relative to respective elements of the snubber to create the stiff attachment, a resilient member configured to bias the dog in the engaged position, and a powered retainer coupled to the resilient member and configured to counter the resilient member to hold the dog in the retracted position until loss of power to the retainer is experienced.

The resilient member may include a windable spring.

The retainer may include a powered clutch.

The actuatable snubber may further include a motor configured to move the resilient member in order to move the dog to the retracted position and to create stored potential energy in the resilient member that is maintained via the powered retainer.

The dog may be movable in response to loss of power to the retainer to engage a corresponding recess in one of the outer shell or the inner gimbal, thereby resisting relative movement between the outer shell and the inner gimbal.

A recess cavity may have a diametrical cross-section sized larger than a diametrical cross-section of the dog receivable therein, and an edge of the recess may be radially inwardly-beveled to direct the dog into the cavity of the recess located radially inwardly of the edge.

According to still another aspect, an unmanned aerial vehicle includes a fuselage, and a sensor system coupled to the fuselage and including an outer shell, an inner gimbal within the outer shell, and extendable snubbers that selectively couple together the inner gimbal and the outer shell. Each snubber includes a dog movable to an engaged position from a retracted position and a powered retainer coupled to the dog and maintaining the dog in the retracted position when powered. The inner gimbal is vibrationally isolated from the outer shell and able to move relative to the outer shell when the snubbers are in the retracted position. The inner gimbal is stiffly coupled to the outer shell when the snubbers are in the engaged position. The dogs of the snubbers are movable from the retracted position to the engaged position in response to loss of power to the respective retainers.

According to another aspect, a method of protecting a device against one or more shocks includes the steps of (a) operating the device in a vibration isolation mode, with vibration dampers between a first part of the device and a second part of the device, with the second part able to move relative to the first part, damped by the vibration dampers, and (b) shifting the device from the vibration isolation mode to a shock protection mode by extending a plurality of snubbers of the device to limit movement of the second part with respect to the first part, the snubbers mechanically actuating in response to loss of power to the snubbers.

The device may be coupled to an unmanned aerial vehicle and one of the first part and the second part may be an outer shell and the other of the first part and the second part may be an inner gimbal movable relative to the outer shell, and the shifting may occur during flight of the unmanned aerial vehicle.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the disclosure.

DETAILED DESCRIPTION

The present invention provides a shock-resisting device including an actuatable snubber for restraining an inner payload, such as an inner gimbal, relative to an outer member, such as an outer shell. For example, the exemplary device may be utilized for restraining an inner optics payload relative to an external gimbal or frame of a vehicle, such as an aerial vehicle. The shock-resisting device, and particularly the actuatable snubber, is rapidly deployable and protects the payload from shock damage, such as by providing a stiff attachment between the inner payload and the outer member. The shock-resisting device is configured to serve as a failsafe, deploying in the event of power loss to any of the vehicle as a whole, the inner payload, the shock-resisting device, the snubber of the shock-resisting device, or to a particular component of the actuatable snubber.

Figure 1:
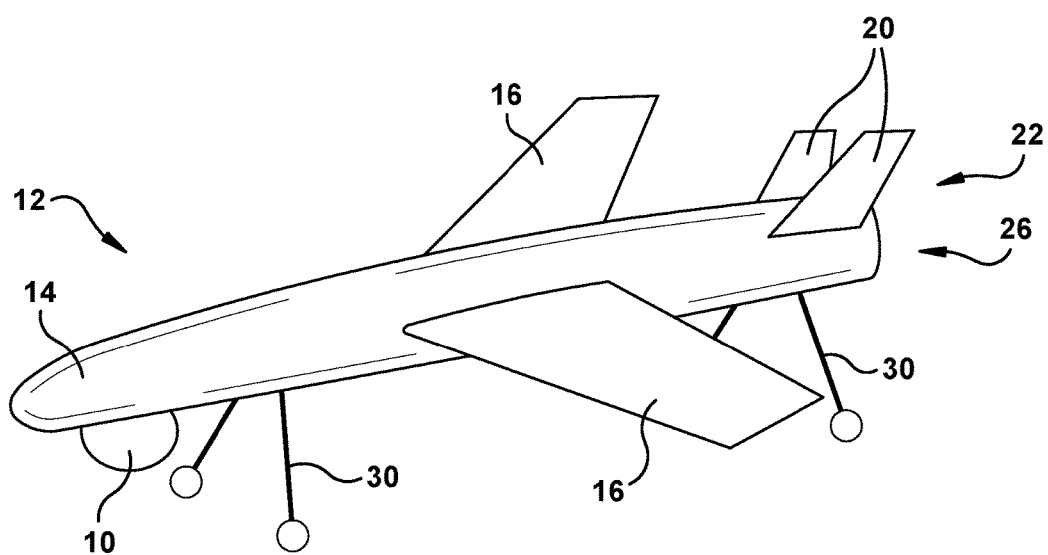
FIG. 1 is an elevational view of an aerial vehicle including a shock-resisting device in accordance with the disclosure.

FIG. 1 illustrates an exemplary shock-resisting device 10 that is part of an unmanned aerial vehicle (UAV) 12. The shock-resisting device 10 is part of a sensory system of the UAV 12, and may be mechanically coupled to the UAV 12. The UAV 12 has many characteristics that are common with current UAVs, such as drones. The UAV 12 has a fuselage 14 for enclosing its main components, wings 16 for providing lift, control surfaces 20 at a tail 22 of the UAV 12 for steering or otherwise changing course of the UAV 12, and a propulsion system 26. The control surfaces 20 alternatively may be in other locations on the UAV 12, such as being canards at the front of the UAV 12, and/or integrated with the wings 16. The propulsion system 26 may be any of a variety of suitable propulsion systems, including propeller engines, jet engines, and rocket motors, for example. As used herein, coupling may refer to direct or indirect coupling.

Other suitable systems may also be included in the UAV 12, including control systems for controlling the various components, and a communication system for sending and receiving information, for instance to control the UAV 12 and to receive data, such as sensor data, from the UAV 12. The UAV 12 may include landing gear 30 to support the UAV 12 during takeoff or landing, and while it is on the ground or otherwise not airborne.

Figure 2:
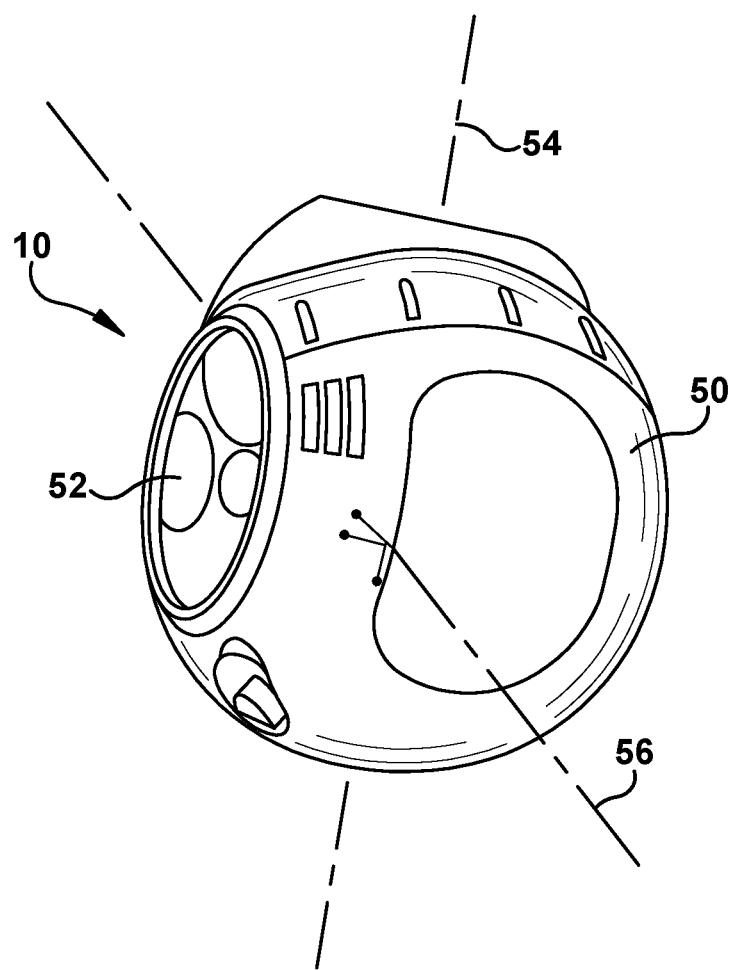
FIG. 2 is an elevational view of the shock-resisting device of the aerial vehicle of FIG. 1.

FIG. 2 depicts further details of the shock-resisting device 10. The shock-resisting device 10 has an outer member, such as an outer shell 50, and an inner gimbal 52, also herein referred to as an inner payload 52. A payload, such as sensors, for example including a camera or other visual sensor, is located within inner gimbal 52, such as within a hollow space in the inner gimbal 52 in one embodiment. In normal operation, the inner gimbal 52 is vibration-isolated from the outer shell 50 and moves relative to the outer shell 50. For example, the depicted inner gimbal 52 rotates with multiple degrees of freedom within the outer shell 50.

The entire shock-resisting device 10 is able to rotate about a vertical axis 54, relative to the fuselage 14 (FIG. 1). In addition, the outer shell 50 is able to rotate about a horizontal axis 56, and the inner gimbal 52 is able to change orientation relative to the outer shell 50. The terms "vertical axis" and "horizontal axis" refer to the orientation of the axes 54 and 56 when the UAV 12 (FIG. 1) is in level flight, oriented parallel to the ground. The terms are not meant to be limiting, but refer to axes at different orientations, such as being perpendicular to one another.

The rotation of the shock-resisting device 10 as a whole, and the pivoting of the outer shell 50, are used to position the sensor payload in a coarse sense. This may be done, for example, to position a camera in the general direction of an object or scene of interest that is to be observed. The inner gimbal 52 is used to provide fine adjustment to the camera or other sensor position. This can be used to keep the camera pointed in the same direction, at a desired viewing target, even when the UAV 12 changes course, maneuvers, or is buffeted during flight.

When viewing a far off visual target, to maintain surveillance at a selected spot or region, it may be important to keep a visual sensor (camera) or other sensor very accurately positioned, all while the UAV 12 continues flying. The inner gimbal 52 not only can rotate relative to the outer shell 50, but also is able to dampen vibrations from different directions. Toward that end, there may be vibration dampers between the outer shell 50 and the inner gimbal 52, resilient damping devices that allow the inner gimbal 52 to move relative to the outer shell 50, during normal operation of the shock-resisting device 10.

All of this damping and isolating of the inner gimbal 52 and its payload is important in keeping a visual sensor accurately positioned to continue to view a distant location while the UAV 12 moves and vibrates, and of necessity changes direction from time to time. The positioning of the shock-resisting device 10, and its various parts, may be handled by a sensor control system 70 (FIG. 3), which interfaces with a communication system (not shown) that allows a remote operator to adjust the position of the camera or other visual sensor, to control what portion of a potential field of view is being focused on.

One difficulty occurs when there are severe shocks to the shock-resisting device 10, an example of such a severe shock being when the UAV 12 lands, such as when the UAV 12 lands on an aircraft carrier. Such shocks can put the shock-resisting system, and particularly an optical sensor located therein, out of alignment. Such shocks may be predictable, since it is known in advance when the UAV 12 will be landing. In other situations, the shocks may not be predictable. And thus it is beneficial that the shock-resisting device 10 have a failsafe for actuating shock-dampening components in response of loss of power to any of the vehicle as a whole, the inner payload, the shock-resisting device, or to a particular component of the shock-resisting device. Furthermore, it may or may not be important for the shock-resisting device 10 to be operational during landing.

Figure 3:
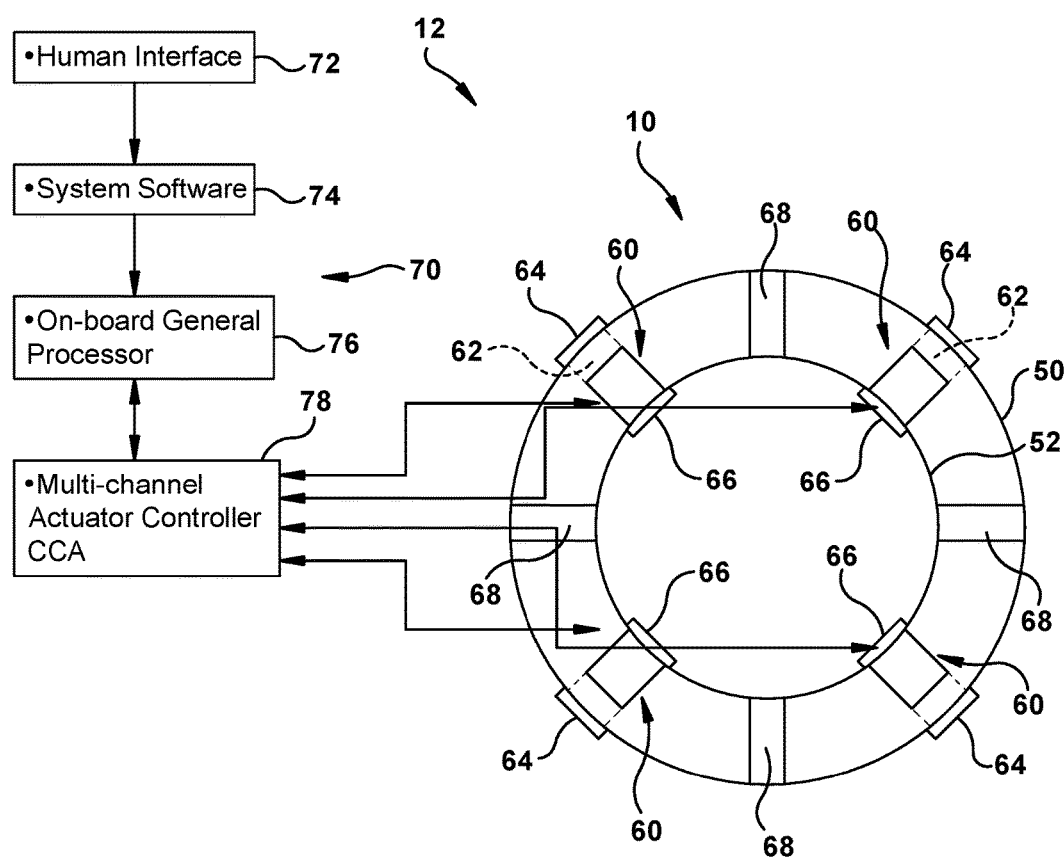
FIG. 3 is a schematic view illustrating further details of the shock-resisting device of FIG. 2, and a control system for controlling the shock resisting device.

With reference now to FIG. 3, the shock-resisting device 10 includes snubbers 60 that may be used to selectively secure the inner gimbal 52 to the outer shell 50. The snubbers 60 are selectively actuatable devices that have extendable elements or members 62 that may be extended to provide a firmer (stiffer) mechanical connection between the inner gimbal 52 and the outer shell 50, to lessen movements of the inner gimbal 52 within the outer shell 50 when a severe shock is encountered. The snubbers 60 may be located in mating pockets 64 and 66 in the outer shell 50 and/or the inner gimbal 52, respectively.

FIG. 3 shows a schematic view of the operation of the snubbers 60, with four of the snubbers 60 in the illustrated schematic. However in actual use a different number of the snubbers 60 may be employed, for example with more snubbers 60 used to secure the inner gimbal 52 against movements in a variety of directions. Damping or vibration isolation devices 68 allow some movement of the inner gimbal 52 relative to the outer shell 50, to isolate the inner gimbal 52 (and its payload) from vibrations in the outer shell 50 (and the rest of the UAV 12).

A control system 70 for controlling the snubbers 60 may include a human interface 72, system software 74, an on-board general processor 76, and a multi-channel actuator controller circuit card assembly (CCA) 78. The human interface 72 may allow a human operator controlling the UAV 12 to selectively activate the snubbers 60, by sending an appropriate signal to the UAV 12. In such case, the signal passes through the software 74, the processor 76, and the CCA 78, to instruct the snubbers 60 to extend their respective extendable members 62. As an alternative, the snubbers 60 may be automatically actuated upon the occurrence of one or more predetermined conditions, such as the UAV 12 being readied for landing, or such as loss of power to any of the vehicle as a whole, the inner payload, the shock-resisting device, or to a particular component of the shock-resisting device.

The snubbers 60 may also be activated when the UAV 12 is not in flight, for example when the UAV 12 is in storage or in transport. Activating the snubbers 60 when the UAV 12 is inactive may help protect the shock-resisting device 10 from misalignment or damage. When the snubbers 60 are activated, a stiff attachment is created between the inner gimbal 52 and the outer shell 50, preventing the relative movement that the damping devices 68 would ordinarily allow. This stiff attachment makes the shock-resisting device 10 better able to withstand shocks. The snubbers 60 may be activated (extended) for landing, and maintained in such a condition until the UAV 12 enters flight again.

In operation, the shock-resisting device 10 may be in a vibration isolation mode during normal operation of the UAV 12. In such a mode the snubbers 60 are provided in respective retracted positions and the inner gimbal 52 is free to move relative to the outer shell 50. The inner gimbal 52 is vibration isolated from the outer shell 50, with the dampers 66 providing vibration isolation. Before landing (or other expected shocks), the snubbers 60 may be actuated (automatically or otherwise) from respective retracted positions to respective engaged positions, to shift the shock-resisting device 10 from the vibration isolation mode to a shock protection mode, with a stiff attachment between the outer shell 50 and the inner gimbal 52.

Figure 4:
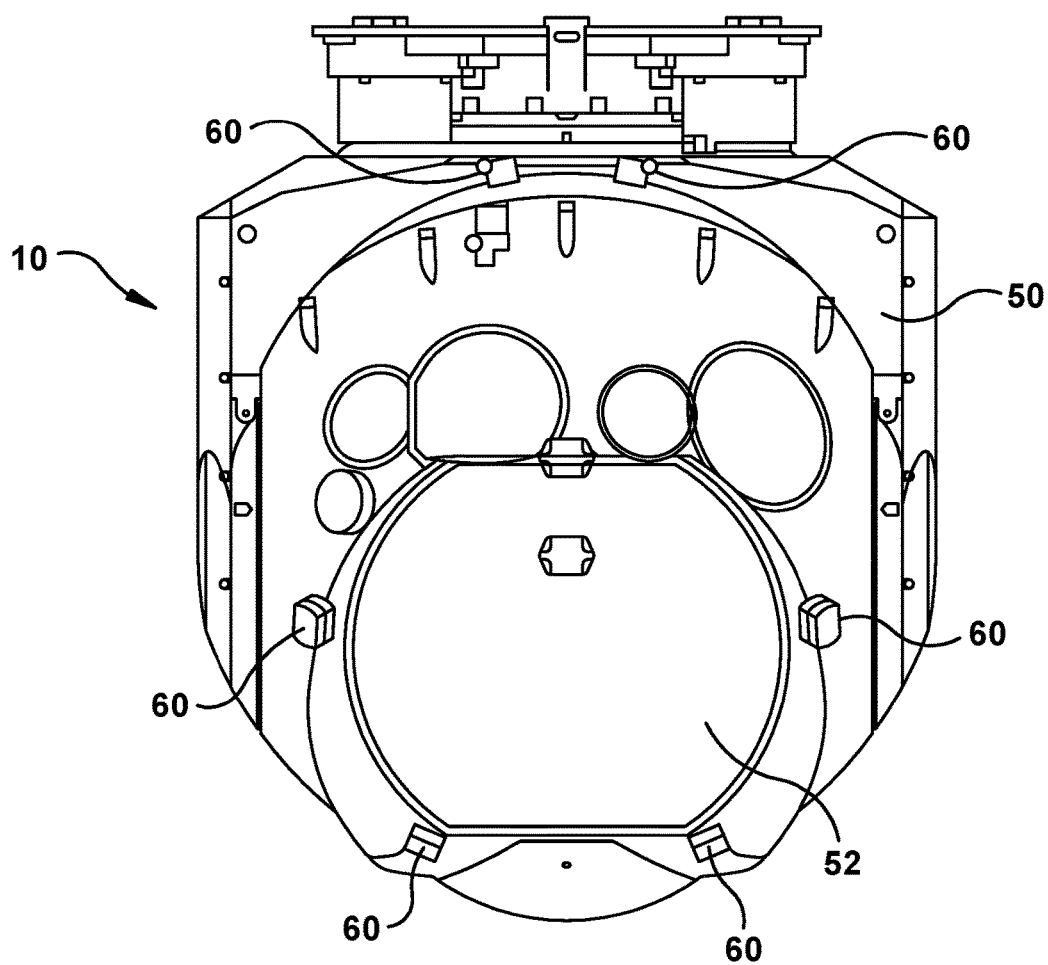
FIG. 4 is a front view of the shock-resisting device of FIG. 2, showing one possible arrangement of snubbers within the shock-resisting device.
Figure 5:
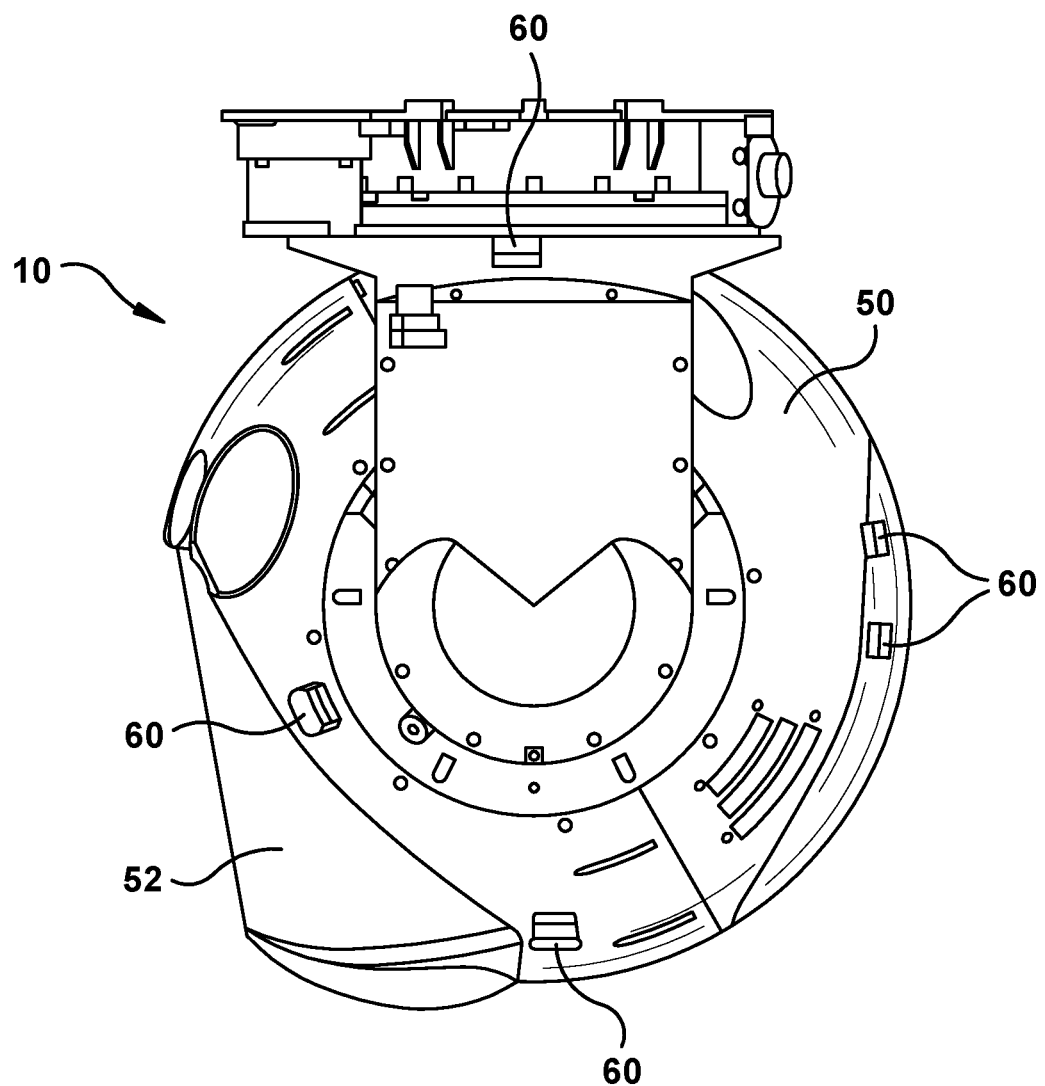
FIG. 5 is a side view of the shock-resisting device of FIG. 2, showing one possible arrangement of snubbers within the shock-resisting device.
Figure 6:
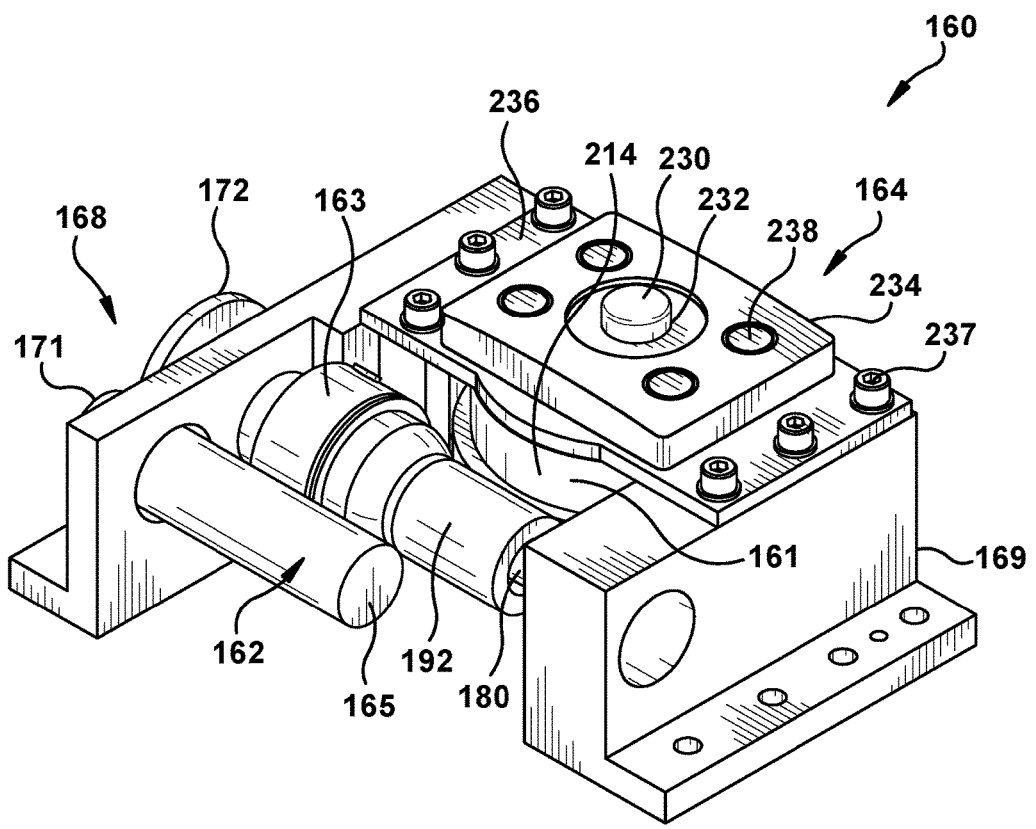
FIG. 6 is a top elevational view of an actuatable snubber in accordance with the disclosure for use with a shock-resisting device.
Figure 7:
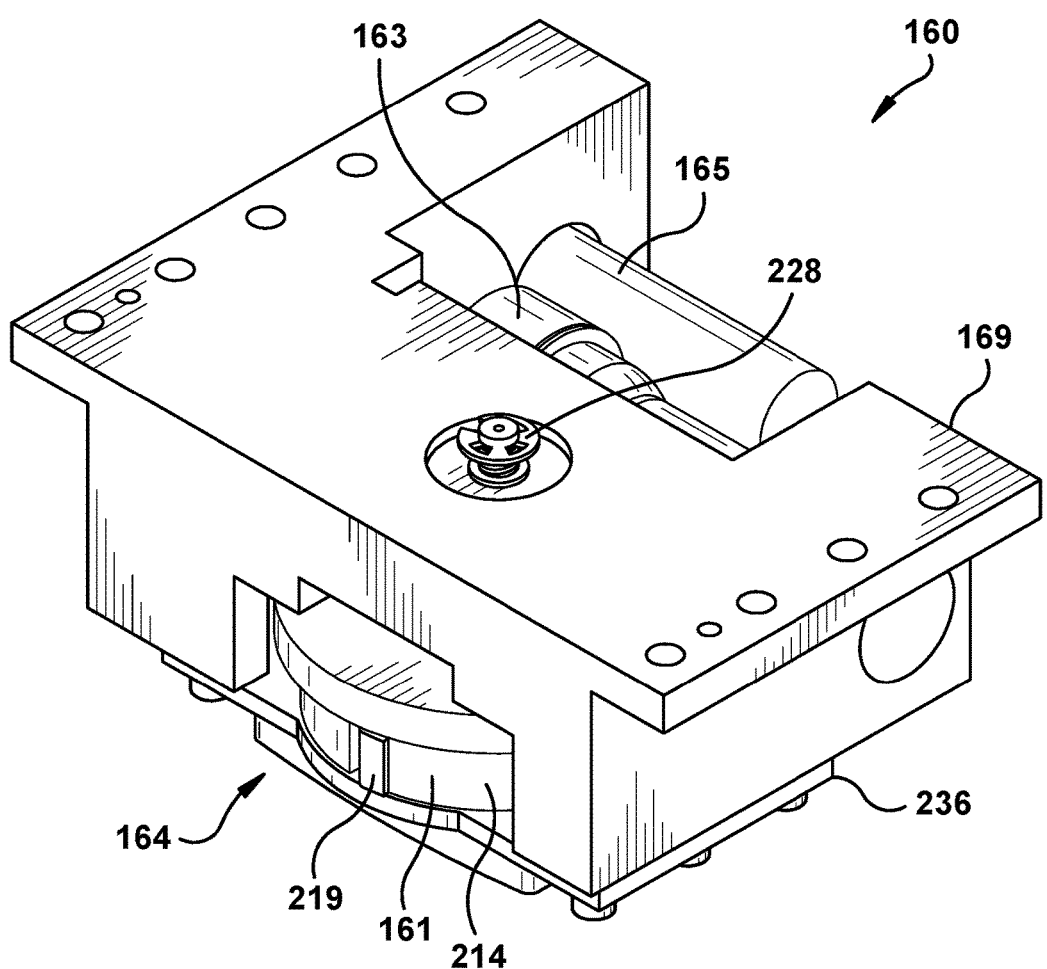
FIG. 7 is a bottom elevational view of the actuatable snubber of FIG. 6.
Figure 8:
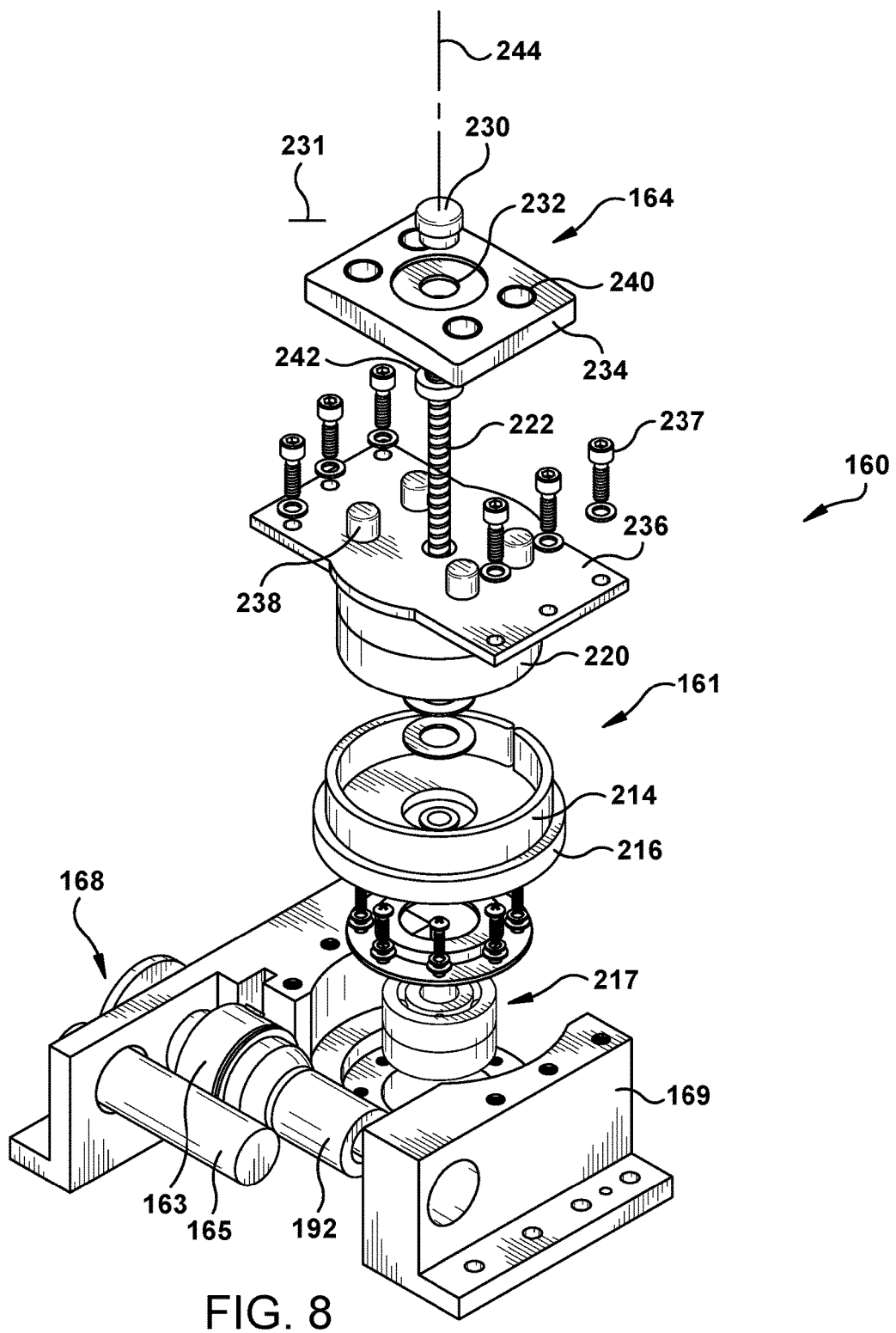
FIG. 8 is a partial exploded view of the actuatable snubber of FIG. 6.

FIGS. 4 and 5 show one possible arrangement for the snubbers 60 within the outer shell 50. The depicted snubbers 60 are mountable to one of the first part or second part, wherein at least one of the first part or second part is movable relative to the other of the first part or second part. In the case of the shock-resisting device of FIGS. 4 and 5, the inner gimbal 52 is movable within the outer shell 50. The snubbers 60 (FIG. 5) are shown as attached to the outer shell 50, such as being located in suitable recess in the outer shell 50. In other embodiments, one or more snubbers 60 may be located in a suitable recess in the inner gimbal 52.

In the depicted embodiment, the snubbers 60 extend from the outer shell 50 to the inner gimbal 52, though the extension may be vice versa where one or more snubbers 60 is mounted to the inner gimbal 52. Accordingly, the outer shell 50 has a radially inward facing surface and the inner gimbal 52 has a radially outward facing surface, and the actuatable snubbers 60 are extendable between the radially inward facing surface and the radially outward facing surface to create the stiff attachment between the outer shell 50 and the inner gimbal 52.

In the illustrated embodiment there are eight of the snubbers 60. Alternatively there may be more of the snubbers 60, or fewer of them. The depicted snubbers 60 are equally circumferentially spaced from one another about the outer shell 50. In other embodiments one or more the snubbers 60 may not be equally spaced from the others.

Turning now to FIGS. 6-11, an exemplary actuatable snubber 160 in accordance with the present disclosure is shown for use with a suitable shock-resisting device, such as the shock-resisting device 10 of FIGS. 4 and 5. It will be appreciated that aspects of the actuatable snubbers 60 and 160 may be substituted for one another or used in conjunction with one another where applicable. The snubber 160 is generally configured to provide a stiff attachment between a first part, such as the inner gimbal 52, and a second part, such as the outer shell 50, upon actuation of the snubber 160. The stiff attachment is provided wholly mechanically and is therefore not reliant on electrical or electromechanical devices for actuation. The snubber 160 is movable between a retracted position and an engaged position to create the stiff attachment.

The stiff attachment of the snubber 160 may be actuated manually or by a controller, such as when it is known that a respective shock-resisting device will be subject to an impact. The snubber 160 also serves as a failsafe to actuate automatically in response to loss of power to the snubber 160. In this way, sensitive and/or expensive payload components of a respective inner gimbal may be protected from shock damage or other impact, such as due to partial or total system failure. It will be appreciated that loss of power may be vehicle-wide to an entire respective vehicle, or loss of power may be only to one or more parts of a respective shock-resisting device, such as to the snubber 160. Accordingly, at least loss of power to one or more components of the snubber 160 actuates the snubber 160 to provide the stiff attachment.

Generally, the snubber 160 includes a potential-energy-storing reservoir 161 that is configured to drive the stiff attachment and a prime mover 162 that is configured to drive the potential-energy-storing reservoir 161, thus creating stored potential energy in the reservoir 161. A retainer 163 is provided and is configured to retain the stored potential energy in the reservoir 161 until such time that the retainer 163 has a state change, and the potential energy is released.

Figure 9:
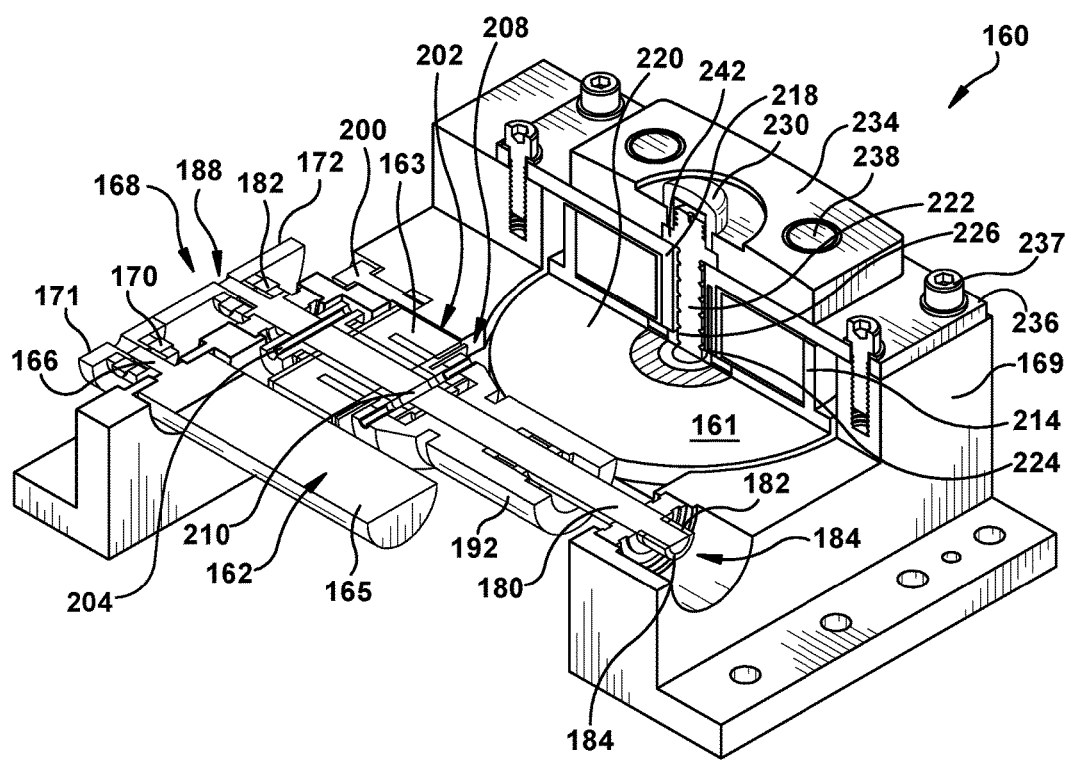
FIG. 9 is a partial cross-sectional view of the actuatable snubber of FIG. 6.
Figure 10:
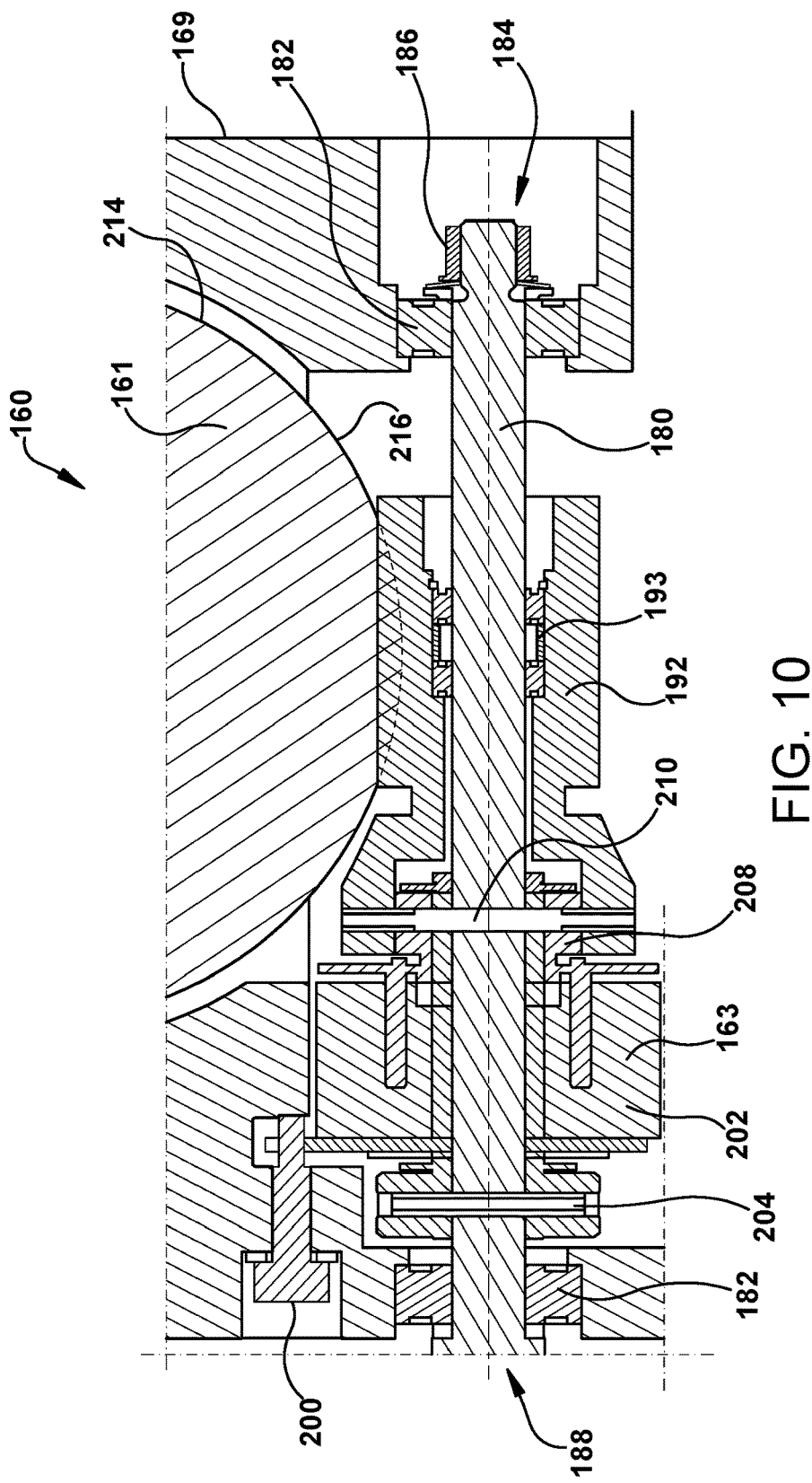
FIG. 10 is another partial cross-sectional view of the actuatable snubber of FIG. 6.
Figure 11:
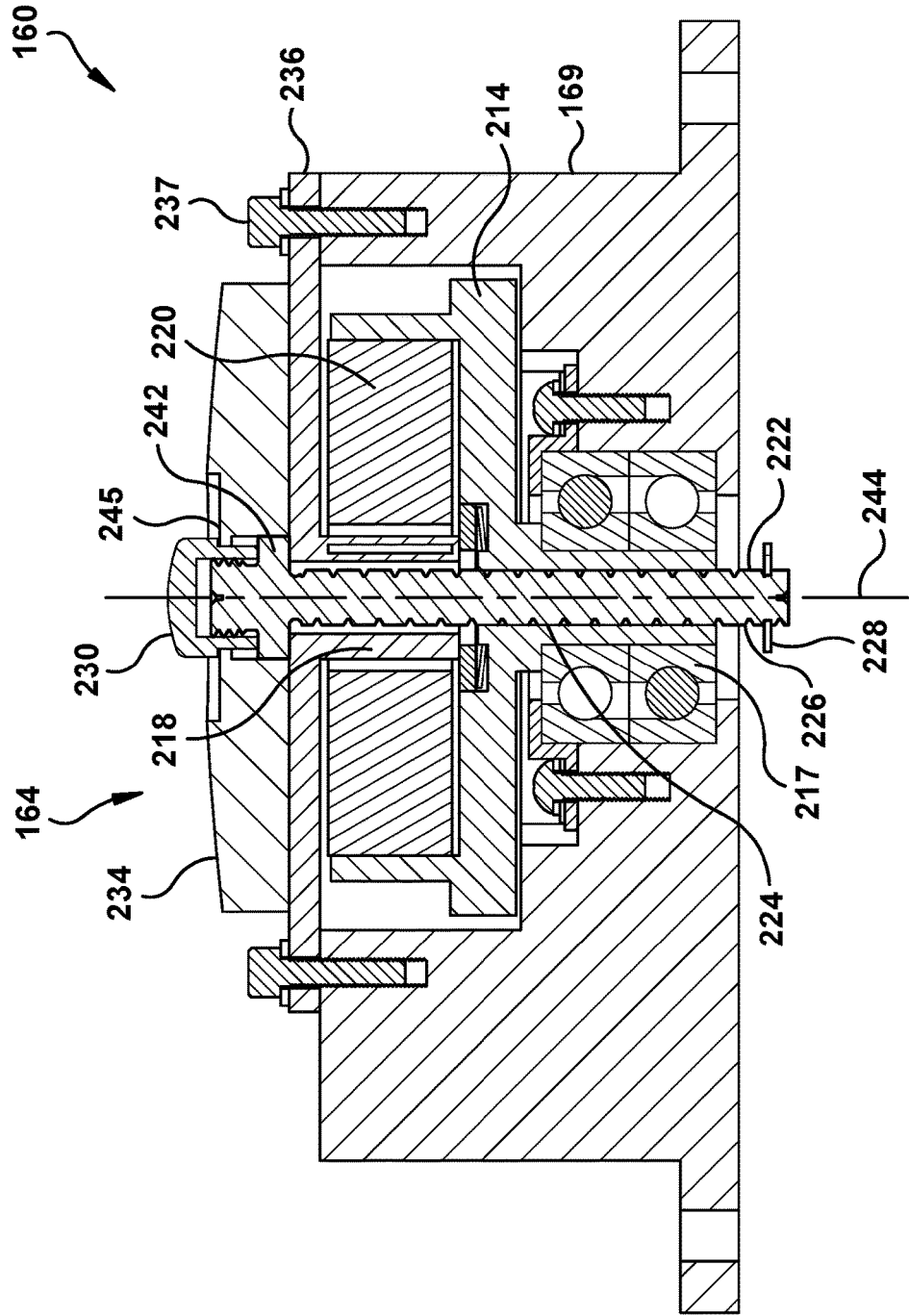
FIG. 11 is yet another partial cross-sectional view of the actuatable snubber of FIG. 6.

More particularly, as shown best in FIGS. 9-11, the depicted snubber 160 is a mechanically-engaging snubber for selectively extending a snubber element 164. The small prime mover 162, such as a motor 165, has a motor shaft 166 that is coupled to gearing 168. The motor 165 is fixed to a mounting frame 169, also herein referred to as a housing, for providing attachment to a respective structure, such as to the outer shell 50. In some embodiments, the mounting frame 169 may be integral with the respective structure. The motor shaft 166 is supported in the mounting frame 169, such as by a bushing 170, such as a rotary bearing.

The motor 165 may be any of a variety of suitable electric motors, an example of a suitable motor being a 15 mm, 12 volt motor with an integral encoder, although many other suitable kinds of motors may be used instead. The motor 165 may be powered from the same power system that powers other components of a respective shock-resisting device or UAV. While the motor 165 is shown as an electric motor, it will be appreciated that any other suitable prime mover 162 may be used.

The gearing 168 includes a spur gear set having a pinion gear 171 coupled to the motor shaft 166 and a bull gear 172 coupled to a drive shaft 180. The pinion gear 171 and the bull gear 172 have interlocking teeth. It will be appreciated that other suitable gearing arrangements may be used. The spur gear set may have a 2:1 gear ratio, for example.

The drive shaft 180 is supported in the mounting frame 169 by opposed bushings 182, such as rotary bearings. A distal end 184 of the drive shaft 180 has an end attachment, such as a nut 186, to prevent translational movement of the drive shaft 180 relative to the mounting frame 169. An opposite proximal end 188 of the drive shaft 180 is coupled to the bull gear 172.

A drive gear 192 is fixed to the drive shaft 180 for joint rotation therewith in response to actuation of the motor 165 or to backdriving force from the potential-energy-storing reservoir 161. The illustrated drive gear 192 is a helical gear disposed about the drive shaft 180. The helical gear may have a gear ratio of 8:1, for example. The drive gear 192 is supported on the drive shaft 180 via suitable bushings 193, such as rotary bearings. In other embodiments, the drive gear 192 may not be disposed about the drive shaft 180, where suitable. It will be appreciated that the drive gear 192 may be any other suitable backdrivable drive gear, such as a suitable worm gear, in other embodiments.

The retainer 163 is coupled to each of the drive gear 192 and the drive shaft 180 for preventing rotational movement of each of the drive gear 192 and the drive shaft 180. The retainer 163 is powered, such as via the same power system that powers other components of a respective shock-resisting device or UAV. The illustrated retainer 163 includes a powered clutch, such as an electromagnetic clutch. In other embodiments, the retainer may include another suitable clutch system for preventing rotational movement, such as a spring-, toothed-, or gear-type electromagnetic or manual clutch, and/or the retainer may be hydraulically powered, for example.

The retainer 163, also herein referred to as a retainer clutch 163, is coupled to the mounting frame 169 by a suitable fastener 200, such as a screw. The screw 200 serves as an anti-rotation screw to prevent rotation of the retainer clutch 163 relative to the mounting frame 169. The screw 200 may also serve to limit or prevent translational movement of the retainer clutch 163 relative to the mounting frame 169.

The retainer clutch 163 is separately coupled to each of the drive shaft 180 and the drive gear 192. A retainer clutch proximal portion 202 is provided to prevent rotation of the drive shaft 180 in a direction opposing the motor 165. The proximal portion 202 is coupled to the drive shaft 180 by a suitable fastener 204, such as a mating pin. The proximal portion 202 is configured to prevent such rotation of the drive shaft 180 without respect to the proximal portion 202 being powered. Any suitable clutch componentry may be used, such as corresponding teeth allowing rotation in one direction but preventing rotation in an opposite direction.

A retainer clutch distal portion 208 is provided to prevent rotation of the drive gear 192, also in a direction opposing the motor 165, but in situations when the distal portion 208 is powered. In other words, the retainer clutch 163, generally, when powered, does not allow the drive gear 192 to free spin opposite the direction of the motor. The distal portion 208 is coupled to the drive gear 192 by a suitable fastener 210, such as a set screw. The distal portion 208 includes any suitable electromagnetic components for preventing such rotation of the drive gear 192.

Accordingly, upon loss of power to the retainer clutch 163, and particularly to the powered distal portion 208, the drive gear 192 is enabled to spin freely of the drive shaft 180, the spur gear set of gearing 168, and the drive motor 165. In particular, upon loss of power to the distal portion 208, and thus loss of clutching force on the drive gear 192, the drive gear 192 is backdriven via the potential-energy-storing reservoir 161, allowing release of the stored potential energy in the reservoir.

Turning now to the potential-energy-storing reservoir 161, the reservoir 161 may be any suitable mechanical device for being driven by the drive gear 192 and configured to create stored potential energy for driving a snubber element 164 for causing the stiff attachment. As shown, the reservoir 161 is a suitable power spring. The power spring includes an outer arbor 214 having corresponding threading 216 (FIG. 8) for mating with the drive gear 192 at a radially outer surface of the outer arbor 214. The outer arbor 214 is rotationally supported in the mounting frame 169 by suitable bushings 217 (FIG. 8), such as rotary bearings.

An inner arbor 218 is fixedly coupled to the mounting frame 169 and may be attachable to or integral with the mounting frame 169. The fixing of the inner arbor 218 prevents rotational movement of the inner arbor 218.

A resilient member, such as a windable member 220, is coiled between the inner arbor 218 and the outer arbor 214. A radially inner tang (not shown) of the windable member 220 is fixedly coupled to the inner arbor 218, such as being crimped. A radially outer tang 219 (FIG. 7) of the windable member 220 is fixedly coupled to the outer arbor 214, also such as being crimped.

The power spring 220 may provide about 270 lbs. of preload at maximum rotation/winding. In one embodiment, the preload may decrease or increase by about 30 lbs. for each rotation. It will be appreciated that in other embodiments, the outer arbor 214 may be fixed and the inner arbor 218 may be the driven arbor.

The outer arbor 214 is drivable by the motor 165 to wind the windable member 220, creating stored potential energy. Upon loss of power to the retainer clutch distal portion 208, the drive gear 192 becomes backdrivable, allowing the windable member 220 to unwind, releasing the stored energy as rotation of the outer arbor 214.

It will therefore be appreciated that the retainer 163 is configured to retain stored potential energy in the reservoir 161 and to prevent rotation of the outer arbor 214 in a driving direction that would cause the stiff attachment. The retainer 163 is likewise configured to cause the snubber 160, and particularly the snubber element 164, to move from a retracted position to an engaged position in response to loss of power to the retainer 163, and in particular, in response of loss of power to the retainer clutch distal portion 208.

The rotation of the depicted outer arbor 214 in a driving direction provides direct torque for driving the snubber element 164. The rotation of the outer arbor 214 in a driving direction is translated into translational movement of a threaded shaft 222, threadedly coupled to the outer arbor 214 and attached to the snubber element 164. The outer arbor 214 includes threads 224 at an inner radial surface for mating with threads 226 of the threaded shaft 222.

The threaded shaft 222, such as a power screw, is fixedly attached to the snubber element 164. The depicted threaded shaft 222 has a double start for providing rapid linear movement of the snubber element 164. Any suitable number of starts may be used in other embodiments.

The threaded shaft 222 extends through each of the rotatable outer arbor 214 and the fixed inner arbor 218, though the threaded shaft 222 is not threadedly engaged with the inner arbor 218 as it is with the outer arbor 214. At a proximal end 227 (FIG. 11) of the threaded shaft 222, a retaining element, such as a retaining ring 228, limits translational movement of the threaded shaft 222 and snubber element 164. The retaining ring 228 is sized to abut at least one of the mounting frame 169, bushings 217, or outer arbor 214 when the threaded rod 222 is overly translated in an extension or engaging direction.

The threaded shaft 222 is anti-rotated to allow for its translational movement, such as via a key and slot arrangement (not shown). For example, one of a key or corresponding slot may be attached to or formed integral with the threaded shaft, such as at the proximal end 227 of the threaded shaft 222. Other locations on the threaded shaft 222 may also be suitable. The other of the key or corresponding slot may be attached to or formed integral with one of the mounting frame 169, inner arbor 218, or body to which the snubber 160 is attached (such as a respective inner gimbal or outer shell), among other suitable locations.

The snubber element 164 is attached to a distal end 229 (FIG. 11) of the threaded shaft 222 opposite the proximal end 227. The snubber element 164 includes a shear cap, such as a dog 230, attached to a distal end of the threaded shaft 222, such as by a locating pin 231. The depicted attachment is made by way of threads, though other methods may be suitable. The dog 230 is received in a hole 232 (FIG. 8) of a compression pad 234 of the snubber element 164. The dog 230 is not fixedly attached to the compression pad 234.

The compression pad 234 is supported on a mounting plate 236 that is fixedly coupled to the mounting frame 169, such as by suitable fasteners 237. The mounting plate 236, also herein referred to as a shear plate, includes one or more axially-extending projections, such as shear posts 238. The shear posts 238 are received in one or more respective shear cavities 240 of the compression pad 234 for resisting rotation of the compression pad 234 relative to the remainder of the snubber 160. As shown, the mounting plate 236 also axially restrains the outer arbor 214 to prevent axial movement of the outer arbor 214 relative to the mounting frame 169.

The threaded shaft 222 includes a radially outwardly extending flange 242 axially located along the longitudinal axis 244 of the threaded shaft 222 at the distal end of the threaded shaft 222, adjacent the dog 230. When the snubber 160 and the dog 230 are in a retracted position, the flange 242 is axially spaced from an engagement shelf 245 of the compression pad 234. Accordingly, upon initial translation of the dog 230 and threaded shaft 222, the compression pad 234 will not move axially therewith until contact is made between the flange 242 and the engagement shelf 245.

Upon loss of power to the retainer 163 and subsequent driving rotation of the outer arbor 214, the threaded shaft 222 turns as part of the extension process, raising the threaded shaft 222 relative to the mounting frame 169. The compression pad 234 initially does not extend. Instead, initially the dog 230 on the distal end of the threaded shaft 222 extends above a top surface of the compression pad 234. Once the flange 242 of the threaded shaft 222 reaches the shelf 245 on the compression pad 234, the compression pad 234 begins to extend away from the mounting frame 169 and mounting plate 236. The dog 230 continues to protrude from the compression pad 234. When the compression pad 234 is fully extended, the protruding dog 230 engages a corresponding recess in the other of the outer shell or inner gimbal to which the mounting frame 169 is not coupled or integral therewith.

It is thus understood that the windable member 220 in a default unwound state provides a biasing force to bias the snubber element 164 in an engagement or extension position. The motor 165 via the outer arbor 214 winds the windable member 220, in a direction opposite the driving direction, to counter the biasing force, and to move the snubber element 164 to the retracted position, since the snubber element 164 is threadedly coupled to the outer arbor 214. Thus, when the threaded shaft 222 bottoms out in a retraction translation direction, such as where the flange 242 abuts the mounting plate 236, the windable member 220 is not further wound. The retainer 163 maintains the countering of the biasing force to prevent provision of the stiff attachment until loss of power to at least the retainer 163.

When the snubber element 164 is in the engaged position, the snubber 160 provides a normal force to aid in securing the inner gimbal to the outer shell. Engagement of the dog 230 and the compression pad 234 with the other of the outer shell or inner gimbal aids in resisting shock to the shock-resisting device 10. Shear load travels through the dog 230 and the threaded shaft 222 until the dog 230 bottoms out against the compression pad 234 and the compression pad 234 bottoms out against the shear posts 238. Shear load then bypasses the threaded shaft 222 and travels directly from the dog 230 to the compression pad 234 and shear posts 238, then though the mounting plate 236, to the mounting frame 169. Axial load travels through the compression pad 234 to the threaded shaft 222 and subsequently to the outer arbor 214, then as thrust load, the axial load may extend to the bushings 217 and to the mounting frame 169.

The snubber 160 may have an actuation time of about 1 second to about 10 seconds, and more preferably of about 3 seconds to about 5 seconds. The snubber 160 may have a retraction time of about 5 seconds to about 15 seconds, and more preferably of about 10 seconds. The snubber 160 may have a threaded shaft stroke of about 0.1 inches to about 0.2 inches, and a peak actuation force of about 270 lbs. A large range of other values are possible in other embodiments.

Figure 12:
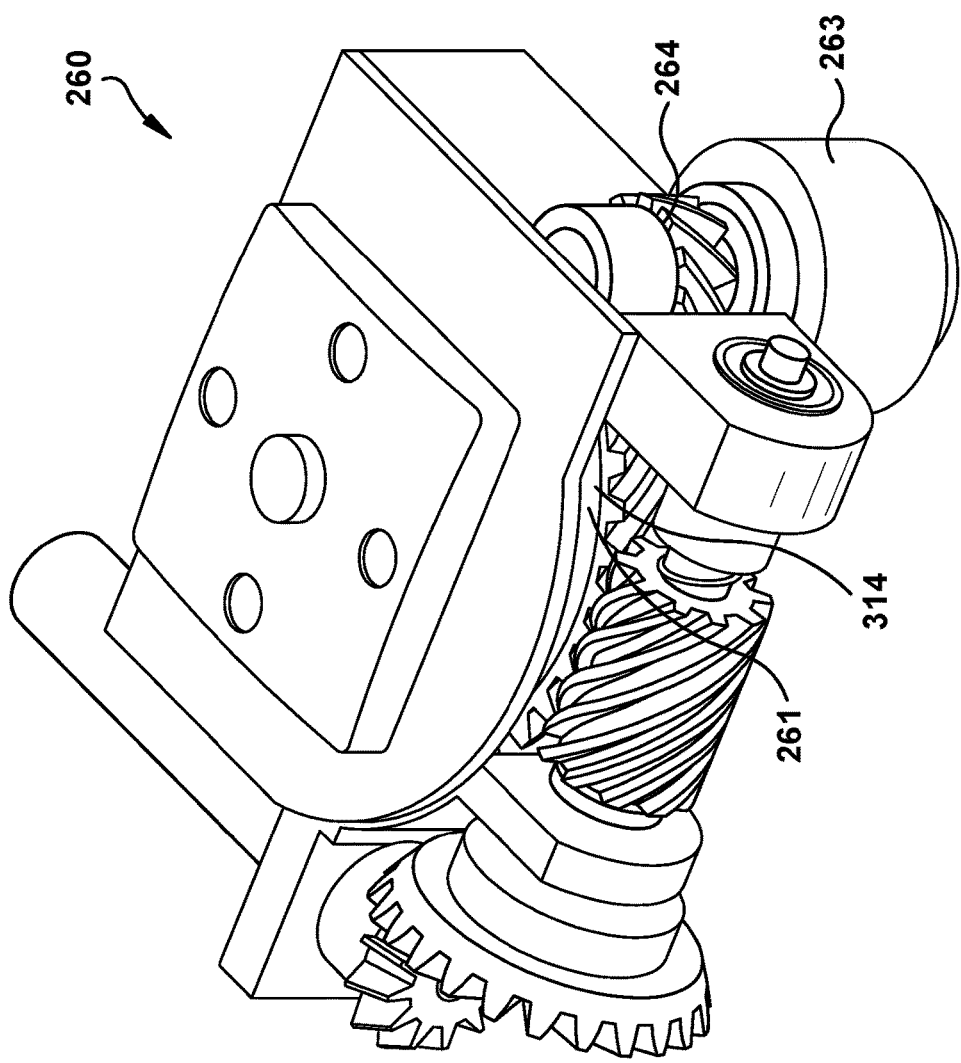
FIG. 12 is a top elevational view of another actuatable snubber in accordance with the disclosure for use with a shock-resisting device.
Figure 13:
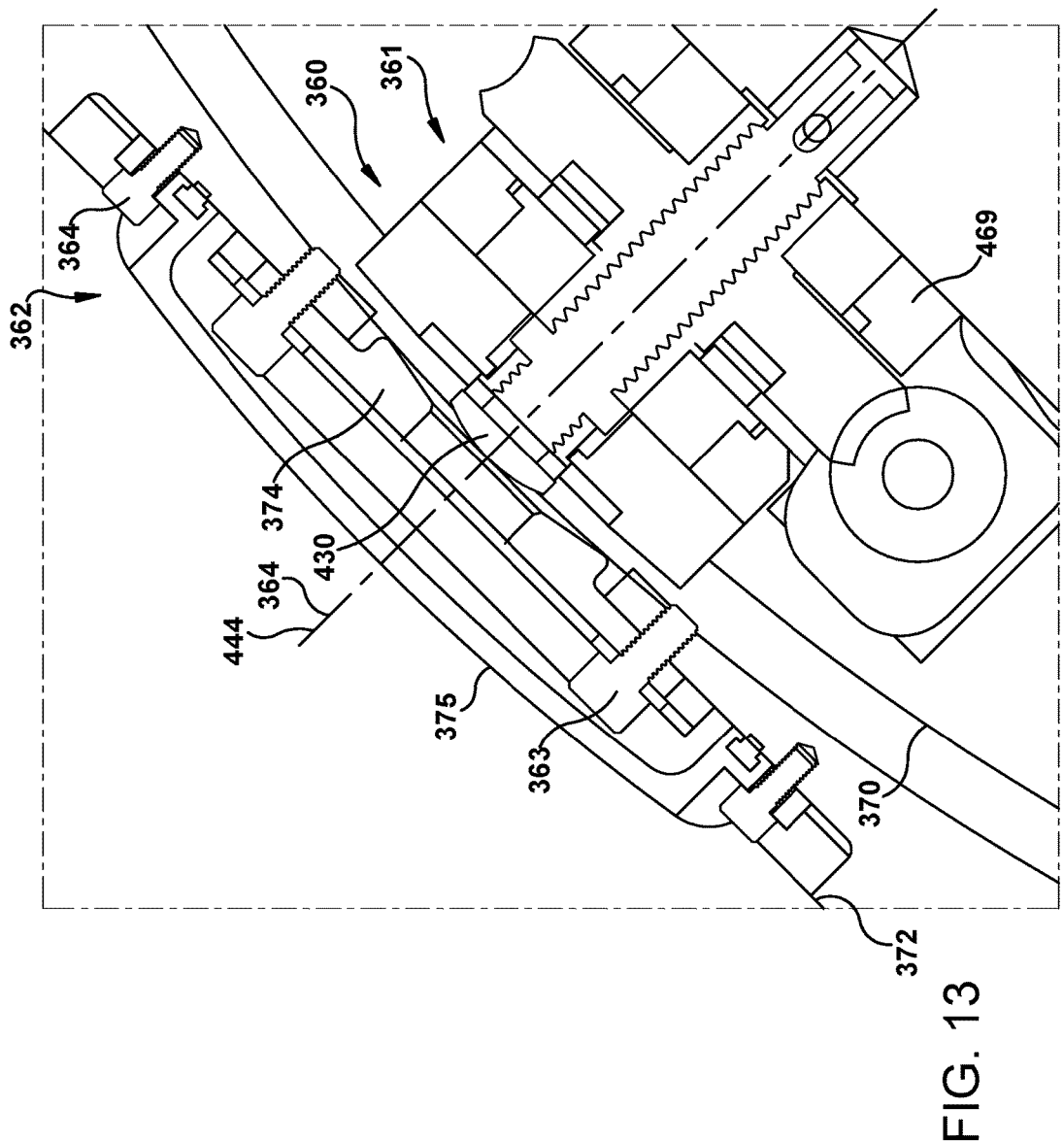
FIG. 13 is a partial schematic view of yet another actuatable snubber in accordance with the disclosure for use with a shock-resisting device.
Figure 14:
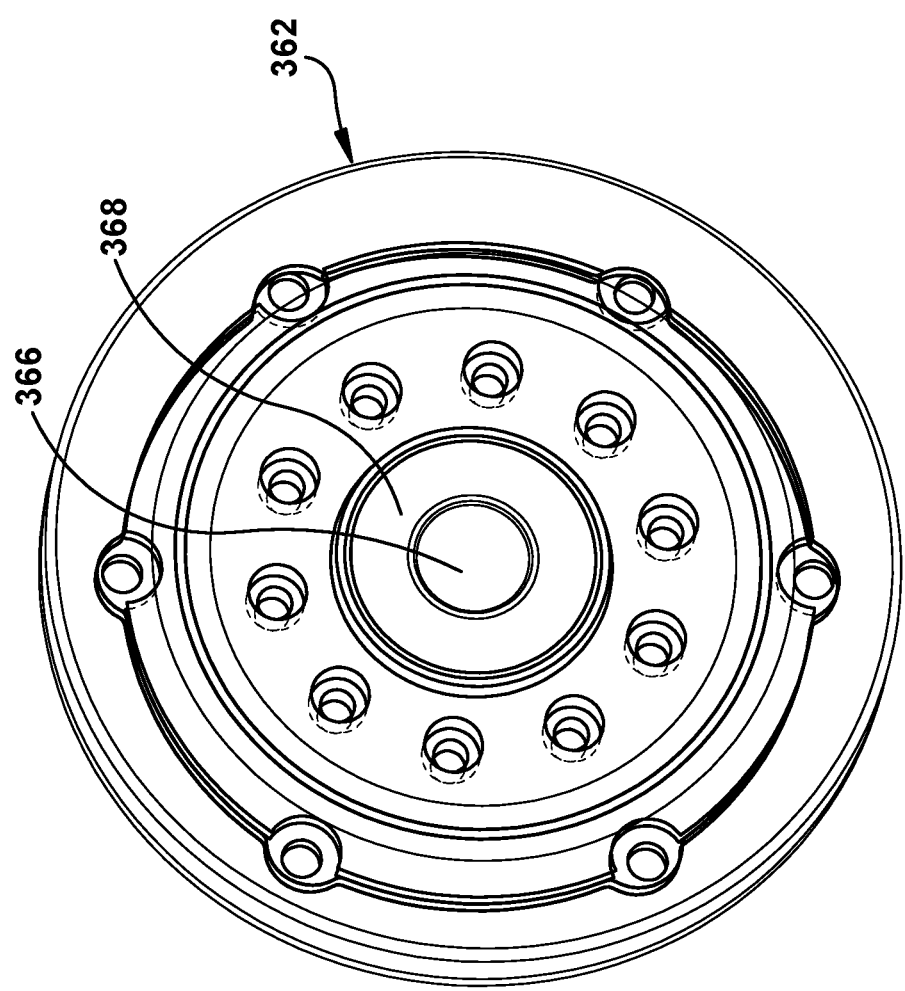
FIG. 14 is a partial top view of the actuatable snubber of FIG. 13.
Figure 15:
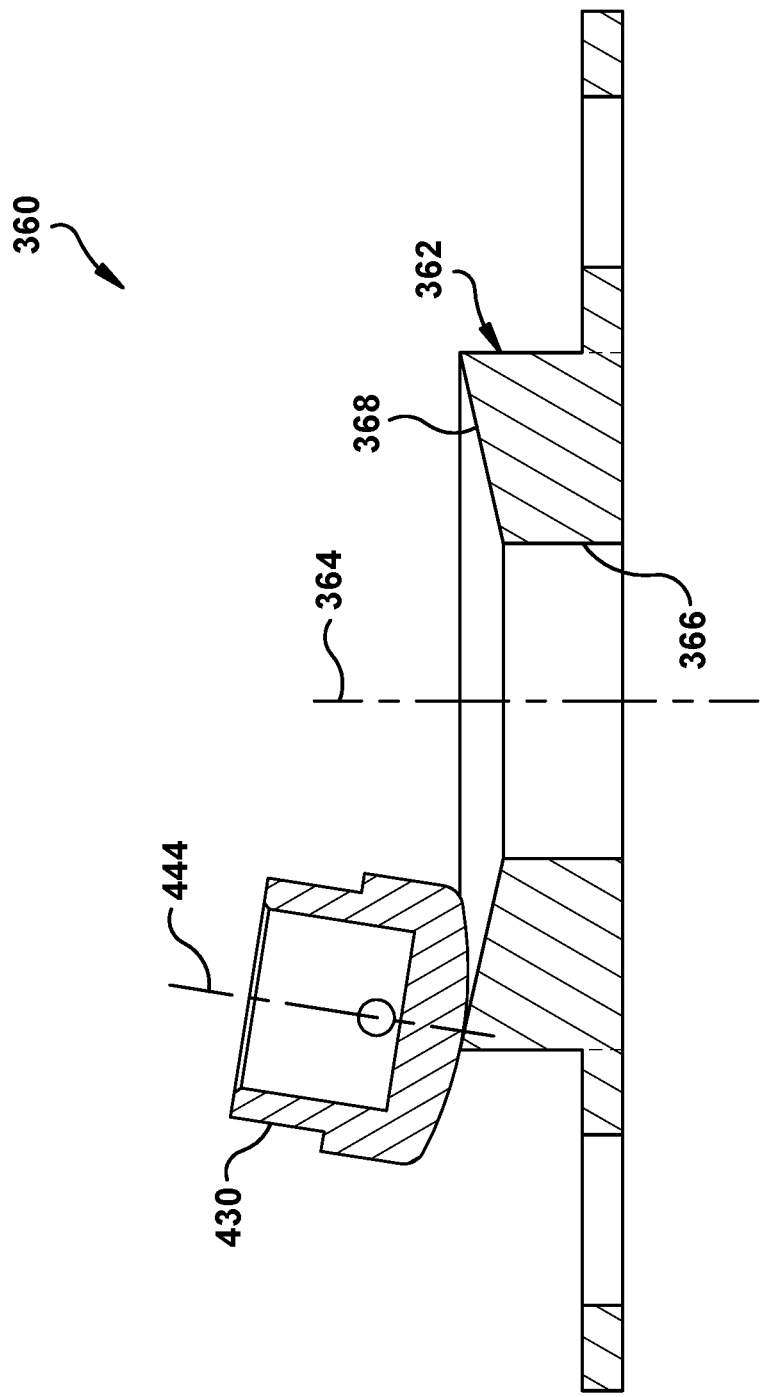
FIG. 15 is a partial cross-sectional view of the actuatable snubber of FIG. 13.
Figure 16:
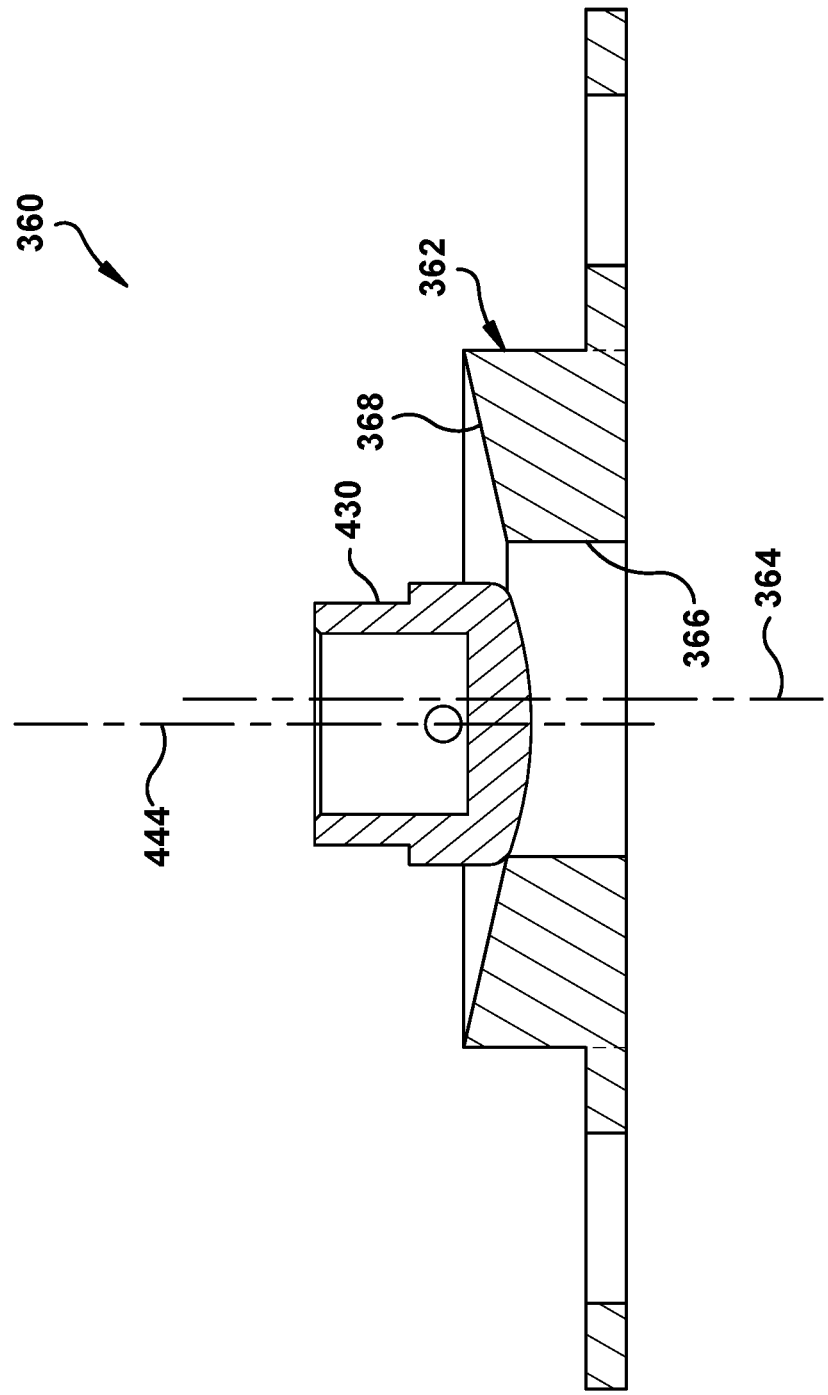
FIG. 16 is another partial-cross sectional view of the actuatable snubber of FIG. 13.

Turning next to FIG. 12, another embodiment of an actuatable snubber, similar to the actuatable snubbers 60 and 160, is shown at 260. It will be appreciated that aspects of the actuatable snubbers 60, 160 and 260 may be substituted for one another or used in conjunction with one another where applicable. The snubber 260 provides a retainer 263 that is rotatably coupled with an outer arbor 314 of a potential-energy-storing reservoir 261. The retainer 263 acts to prevent rotation of a clutch shaft (not shown) attached to a clutch gear 264 that is threadedly coupled to the outer arbor 314, rather than acting to prevent rotation of the outer arbor 314 by preventing rotation of the drive gear 292, as in the embodiment of the snubber 160 of FIGS. 6-11. The snubber 260 may provide a smaller footprint than that of the snubber 160.

Turning next to FIGS. 13-16, another embodiment of an actuatable snubber, similar to the actuatable snubbers 60, 160 and 260, is shown at 360. It will be appreciated that aspects of the actuatable snubbers 60, 160, 260, and 360 may be substituted for one another or used in conjunction with one another where applicable.

The snubber 360 includes a tapered recess portion 362 coupled to or integral with the other of the first part and the second part to which the respective mounting frame 469 is coupled to or integral with. Particularly, the snubber 360 has a main portion 361 coupled to a first part 370, such as an inner gimbal of a shock-resisting device, while a corresponding tapered recess 362 is coupled to a second part 372, such as an outer shell of a shock-resisting device.

The tapered recess 362 is provided to aid in receiving a respective dog 430, where the snubber 360/dog 430 are not perfectly centrally aligned with the recess 362. For example, where a longitudinal axis 444 of the dog 430 is not aligned with a central longitudinal axis 364 of the recess portion 362, see, e.g., FIG. 15, the dog 430 may be directed into the recess portion 362, see, e.g., FIG. 16, rather than preventing locking altogether. In one embodiment, a maximum offset of the axes 444 and 364 may be about 2 degrees to about 3 degrees, or more preferably, about 2.5 degrees. This may allow for a total offset correction of about 4 degrees to about 6 degrees, or more particularly about 5 degrees, with respect to an inner gimbal that rotates within an outer shell. Use of the recess portion 362 may also allow for reduction in tolerance stackups between a respective inner gimbal and outer shell.

The depicted recess portion 362 includes a main body 374 coupled to the second part 372 by one or more fasteners 363. A cap 375 of the recess portion 362 is coupled to the second part 372 by one or more fasteners 364. The recess portion 362, and particularly the main body 374, includes a recess cavity 366 for receiving the dog 430. The recess cavity 366 has a diametrical cross-section that is sized larger than a diametrical cross-section of the dog 430 that is receivable into the cavity 366. The recess cavity 366 may be about 0.03 inches to about 0.07 inches larger in diameter than the diameter of the portion of the dog 430 for being received therein.

A recess edge 368 surrounds the recess cavity 366. The recess edge 368 is radially-inwardly-beveled to direct the dog 430 into the recess cavity 366 located radially inwardly of the recess edge 368. The taper angle of the recess edge 368 may be about 15 degrees to about 30 degrees. The recess portion 362 may be coated, along with the shear cap/dog 430, to reduce the coefficient of friction between the dog 430 and the recess portion 362.

The present disclosure also provides a method of protecting a device against one or more shocks. The method includes the steps of (a) operating the device in a vibration isolation mode, with vibration dampers between a first part of the device and a second part of the device, with the second part able to move relative to the first part, damped by the vibration dampers, and (b) shifting the device from the vibration isolation mode to a shock protection mode by extending a plurality of snubbers of the device to limit movement of the second part with respect to the first part, the snubbers mechanically actuating in response to loss of power to the snubbers.

In one embodiment, the device is be coupled to an unmanned aerial vehicle, one of the first part and the second part is an outer shell and the other of the first part and the second part is an inner gimbal movable relative to the outer shell, and the shifting occurs during flight of the unmanned aerial vehicle. The one or more shocks may include a shock provided during landing of the unmanned aerial vehicle.

The various snubbers 60, 160, 260 and 360 described above as possible components of the shock-resisting device 10 (FIG. 1) provide advantages over prior approaches to handling shocks to such sensor systems. The extension of the elements of the snubbers provide a rapidly deployable and high-reliability way to create a statically compliant attachment between vibration isolated components and a base structure, during a shock event such as landing of a UAV 12 (FIG. 1). The snubbers 60, 160, 260, 360 prevent collisions between a respective inner gimbal 52 and a respective outer shell 50. The snubbers 60, 160, 260, 360 can be actuated remotely and/or automatically as a failsafe during operation (flight) of the UAV 12. Thus the snubbers 60, 160, 260, 360 can be engaged (extended) only when needed, such as only during expected shock events or loss of power, while still allowing full functioning of the device 10 at other times, allowing for example full functionality of the sensor system 10 (allowing full regular relative motion and vibration damping between the gimbal 52 and the outer shell 50) when the snubbers 60, 160, 260, 360 have their elements retracted.

The shock-resisting device 10 of the present disclosure may have military, commercial or other applications not limited to surveillance, intelligence, reconnaissance, or force protection operations. For example the shock-resisting device may be part of an aerial vehicle, such as an unmanned aerial vehicle, or may be part of a worn device, for example. It will thus be appreciated that the shock-resisting device may be used for creating a stiff attachment between any two surfaces movable relative to one another for preventing shock damage to one of the surfaces.

The snubbers 60, 160, 260, 360 are described above as parts of a sensor system or of the shock-resisting device 10 that is part of a UAV. However the snubbers may be used for a variety of other systems that are subject to shocks and/or vibrations, for selectively providing a stiffer connection between parts of systems that can otherwise move relative to one another. For example the snubbers may be used for selectively providing a stiffer connection between parts of a washing machine, or other rotating machinery. The snubbers may be selectively deployed (extended) to "lock" parts together, for storage, transportation, or for other reasons.

In summary, and with reference to each of the aforementioned embodiments, the present disclosure provides a shock-resisting device 10 including a snubber 60, 160, 260, 360 that may be selectively moved from a retracted position to an engaged position to selectively create a stiff attachment between a vibration-isolated gimbal 52 of the device 10, and an outer shell 50 of the device 10. The gimbal 52 is movable relative to the outer shell 52. The snubber 60, 160, 260, 360 includes a retainer 163 maintaining the snubber 60, 160, 260, 360 in the retracted position, where the snubber 60, 160, 260, 360 is configured to move from the retracted position to the engaged position in response to loss of power to the retainer 163.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shock-resisting device, comprising:
an outer shell forming a first spherical portion having a radially inward facing surface;
an inner gimbal movable relative to the outer shell, the inner gimbal forming a second spherical portion having a radially outward facing surface opposite the radially inward facing surface; and
an actuatable snubber movable between the radially inward facing surface and the radially outward facing surface when moving between a retracted position and an engaged position to limit movement of the outer shell and the inner gimbal relative to one another,
wherein the actuatable snubber includes a retainer configured to maintain the actuatable snubber in the retracted position,
wherein the actuatable snubber is configured to move from the retracted position to the engaged position in response to loss of power to the retainer,
wherein the actuatable snubber includes a potential-energy-storing reservoir coupled to the retainer, wherein the potential-energy-storing reservoir is configured to release stored potential energy upon loss of power to facilitate moving the actuatable snubber from the retracted position to the engaged position, wherein the potential-energy-storing reservoir includes a resilient member that includes a windable spring, and
wherein the windable spring is configured to release the stored potential energy, in response to loss of power when the actuatable snubber is in the retracted position, by outputting a torque that facilitates moving the actuatable snubber from the retracted position to the engaged position.

2. The shock-resisting device of claim 1, wherein the retainer includes a powered clutch.

3. The shock-resisting device of claim 1, wherein the movement of the actuatable snubber from the retracted position to the engaged position is wholly mechanical.

4. The shock-resisting device of claim 1, wherein the actuatable snubber includes a dog coupled to the retainer that is movable in response to loss of power to the retainer to engage a corresponding recess in one of the outer shell or the inner gimbal, thereby resisting relative movement between the outer shell and the inner gimbal.

5. The shock-resisting device of claim 4, wherein a recess cavity of the recess has a diametrical cross-section sized larger than a diametrical cross-section of the dog receivable therein, and wherein an edge of the recess is radially inwardly-beveled to direct the dog into the cavity of the recess located radially inwardly of the edge.

6. The shock-resisting device of claim 1, wherein the inner gimbal is vibration isolated from the outer shell.

7. The shock-resisting device of claim 1, wherein the inner gimbal includes a visual sensor.

8. The shock-resisting device of claim 1, further including a motor that is configured to wind the windable spring to create the stored potential energy.

9. The shock-resisting device of claim 1, further including a shaft that is coaxial with the windable spring, wherein the torque that is output facilitates actuating the shaft away from the windable spring, and wherein the shaft is configured to move the actuatable snubber from the retracted position to the engaged position when the shaft actuates away from the windable spring.

10. An unmanned aerial vehicle, comprising:
a fuselage; and
a shock-resisting device mechanically coupled to the fuselage, where the shock-resisting device includes
an outer shell,
an inner gimbal movable relative to the outer shell, and
an actuatable snubber between the outer shell and the inner gimbal such that actuating the actuatable snubber from a retracted position, to directly engage either a radially inward facing surface of the outer shell or a radially outward facing surface of the inner gimbal, to limit movement of the outer shell and the inner gimbal relative to one another,
wherein the actuatable snubber includes a retainer configured to maintain the actuatable snubber in the retracted position,
wherein the actuatable snubber is configured to move from the retracted position to being in an engaged position, directly engaged with either the radially inward facing surface or the radially outward facing surface, in response to loss of power to the retainer,
wherein the actuatable snubber includes a potential-energy-storing reservoir coupled to the retainer, wherein the potential-energy-storing reservoir is configured to release stored potential energy upon loss of power to facilitate moving the actuatable snubber from the retracted position to the engaged position, wherein the potential-energy-storing reservoir includes a resilient member that includes a windable spring, and
wherein the windable spring is configured to release the stored potential energy, in response to loss of power when the actuatable snubber is in the retracted position, by outputting a torque that facilitates moving the actuatable snubber from the retracted position to the engaged position.

11. The unmanned aerial vehicle of claim 10, wherein the actuatable snubber includes a dog coupled to the retainer, the dog movable in response to loss of power to the retainer to engage a corresponding recess in one of the outer shell or the inner gimbal, thereby resisting relative movement between the outer shell and the inner gimbal.

12. The unmanned aerial vehicle of claim 11, wherein a recess cavity of the recess has a diametrical cross-section sized larger than a diametrical cross-section of the dog receivable therein, and wherein an edge of the recess is radially inwardly-beveled to direct the dog into the recess cavity of the recess located radially inwardly of the edge.

13. The unmanned aerial vehicle of claim 10, further including a motor that is configured to wind the windable spring to create the stored potential energy.

14. The unmanned aerial vehicle of claim 10, further including a shaft that is coaxial with the windable spring, wherein the torque that is output facilitates actuating the shaft away from the windable spring, and wherein the shaft is configured to move the actuatable snubber from the retracted position to the engaged position when the shaft actuates away from the windable spring.

15. A shock-resisting device, comprising:
an outer shell;
an inner gimbal movable relative to the outer shell; and
a snubber actuatable between the outer shell and the inner gimbal such that actuating the snubber to directly engage either a radially inward facing surface of the outer shell or a radially outward facing surface of the inner gimbal results in a stiff attachment between the outer shell and the inner gimbal, the snubber including
a dog movable from a retracted position to an engaged position relative to respective elements of the snubber to create the stiff attachment,
a resilient member configured to bias the dog in the engaged position, wherein the resilient member includes a windable spring, and wherein the windable spring is configured to release stored potential energy, in response to loss of power when the actuatable snubber is in the retracted position, by outputting a torque that facilitates moving the actuatable snubber from the retracted position to the engaged position, and
a powered retainer coupled to the resilient member and configured to counter the resilient member to hold the dog in the retracted position until loss of power to the retainer is experienced.

16. The shock-resisting device of claim 15, wherein the retainer includes a powered clutch.

17. The shock-resisting device of claim 15, wherein the snubber further includes a motor configured to move the resilient member in order to move the dog to the retracted position and to create stored potential energy in the resilient member that is maintained via the powered retainer.

18. The shock-resisting device of claim 15, wherein the dog is movable in response to loss of power to the retainer to engage a corresponding recess in one of the outer shell or the inner gimbal, thereby resisting relative movement between the outer shell and the inner gimbal.

19. The shock-resisting device of claim 18, wherein a recess cavity has a diametrical cross-section sized larger than a diametrical cross-section of the dog receivable therein, and wherein an edge of the recess is radially inwardly-beveled to direct the dog into the cavity of the recess located radially inwardly of the edge.

20. The shock-resisting device of claim 15, further including a motor that is configured to wind the windable spring to create the stored potential energy.

* * * * *